UNITED STATES PATENT OFFICE.

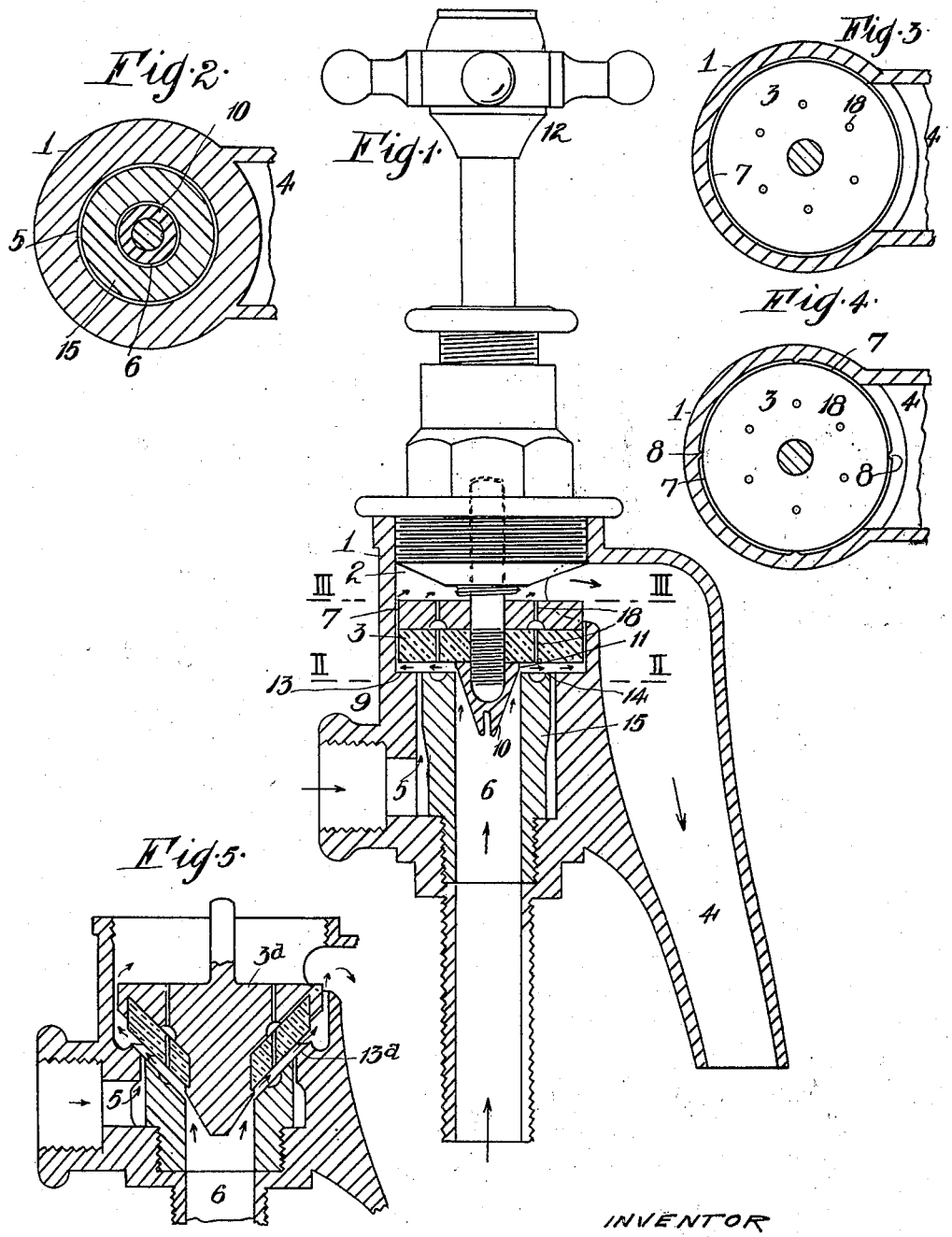

PETER STEWART HANTON, OF KEW, VICTORIA, AUSTRALIA.

MIXING-VALVE FOR STEAM-HEATED WATER-SUPPLY SYSTEMS.

1,327,235.      Specification of Letters Patent.      Patented Jan. 6, 1920.

Application filed August 20, 1917. Serial No. 187,036.

*To all whom it may concern:*

Be it known that I, PETER STEWART HANTON, a subject of the King of Great Britain, residing at No. 52 Cobden street, Kew, in the State of Victoria, Australia, engineer, have invented certain new and useful Improvements in Mixing-Valves for Steam-Heated Water-Supply Systems, of which the following is a specification.

This invention refers to mixing apparatus for steam heated water supply systems which is installed at each delivery point in the system, and the object is the provision of a simple apparatus in which the steam and water are liberated simultaneously by means of a valve and thoroughly mixed before being delivered through the outlet.

In the accompanying drawings:—

Figure 1 is a vertical section (partly in elevation) taken through one form of the mixing apparatus construction in its preferred form.

Figs. 2 and 3 are transverse sections on lines II—II and III—III of Fig. 1.

Fig. 4 is a similar view of Fig. 3 showing a slight modification of construction.

Fig. 5 is a view similar to part of Fig. 1 illustrating a modification in the valve and seat therefor.

According to this invention the valve casing 1 is provided interiorly in its upper portion with a mixing chamber 2 in which is located the control valve 3 and from which leads the delivery outlet or spout 4.

In the base of the casing is provided a pair of separate passages 5, 6 the former communicating with the water supply and the latter with the steam supply and both leading to the inlet of the mixing chamber and are controlled by the valve 3.

An internal shoulder 13 on the casing and the top 14 of a sleeve 15, which latter separates the water and steam passages, constitutes the seating for the valve.

The external diameter of the valve is slightly less than the interior diameter of the mixing chamber thus providing a narrow concentric passage or by-pass 7 between the wall of the casing and the valve upward through which the steam and water passes, when the valve is opened, in a thin film thus insuring an intimate mixture of the fluids within the chamber.

If preferred this passage may be subdivided into a series of by-passes 7 by means of vertical ribs 8 on the interior wall of the mixing chamber as in Fig. 4.

When the valve control medium 12 is operated to release the valve the latter lifts by pressure and water and steam practically simultaneously enter the bottom of the mixing chamber and in passing in a thin film through passage or passages 7 thoroughly mix before entering the delivery outlet or spout 4.

In order to afford escapement of steam or water that might leak owing to fault in the valve or its seating said valve is provided with fine vertical vents 18 which will convey the steam or water leakage to the upper part of the mixing chamber from whence it will escape through the outlet 4.

Furthermore in order to give the inlet of water into the mixing chamber a slight lead over the steam when the valve is being opened the outlet 9 of the steam passage 6 is controlled by a conical projection 10, the upper end portion 11 of which is cylindrical and has a vertical side.

By means of this construction the outlet 9 of the steam passage is not uncovered until the valve has moved upwardly a slight distance.

In some cases where, for instance, the water or steam is of low pressure the valve $3^a$ may be conical and the seating $13^a$ correspondingly shaped as illustrated in Fig. 5. It will be obvious moreover that the contiguous surfaces of the valve and its seating might be correspondingly curved.

It will be evident that the spout 4 may be coupled to branch pipes leading to one or several points of delivery.

I claim:—

A mixing valve for steam and water comprising a valve casing having a circular seat therein defined by an upstanding circular wall, a steam supply conduit opening centrally on the base of said seat, a water supply conduit surrounding said steam supply conduit and opening on the base of said seat, a circular valve of slightly less diameter than said wall arranged in said seat and forming with said wall a narrow annular passage through which the mixture of steam and water passes and means for moving said valve vertically to control the flow of fluids from said conduits, said valve when raised, being disposed within said wall, whereby the fluids pass through the annular passage in a thin film, said valve having fluid escapement vents formed therethrough and opening above the seat between the steam and water conduits.

In testimony whereof I have hereunto set my hand.

PETER STEWART HANTON.